UNITED STATES PATENT OFFICE.

CHARLES DELAMARRE, OF NEW ORLEANS, LA, ASSIGNOR TO HIMSELF, JOHN A. THURBER, AND ROBERT R. BENSON, OF SAME PLACE.

IMPROVEMENT IN THE MANUFACTURE OF SUGAR OR SIRUP FROM SWEET POTATOES.

Specification forming part of Letters Patent No. 109,991, dated December 6, 1870.

*To all whom it may concern:*

Be it known that I, CHARLES DELAMARRE, of the city of New Orleans, State of Louisiana, have invented a new and Improved Process for the Extraction and Manufacture of Sugar or Sirup from Sweet Potatoes by Means of Malted Barley; and I do hereby declare that the following is a full and exact description of the same.

The object of my invention is to extract fully from sweet potatoes, by means of Canada malt or other malted barley, with the process hereinafter set forth, the saccharine matter therein contained, so as to make, at will and economically, either sugar or sirup therefrom.

My invention consists, first, in the use of sweet potatoes as the matter from which sugar or sirup is made by means of the process hereinafter described; second, in the specific process by means of which the saccharine matter is extracted and converted into sugar or sirup, as desired.

The sweet potatoes are at first steamed or boiled in water. They are then reduced to a thin paste by being mashed with reeded rollers, made of wood and not of metal, in order to the whiteness of the paste not being diminished by oxides. Crushed Canada malt or other malted barley, in the proportion of eight pounds to one hundred pounds of sweet potatoes, having been scalded in a mash-tub with water heated by means of direct steam in a worm to a temperature of 180° Fahrenheit, the water being in a proportion of twenty-five gallons per one hundred pounds of potato-paste, the above-described potato-paste is now placed into this mash-tub. Immediately thereafter the temperature in the mash-tub is increased to 220° Fahrenheit. Then cold water in the proportion of five gallons per one hundred pounds of potato-paste is added to the mixture in the mash-tub, so as to precipitate, by a decrease of temperature, the pulp that might be remaining in the liquid compound. This liquid, after having been allowed to settle during a certain time, is then drawn out, and any surplus liquid remaining in the pulp will be obtained by pressing it out by means of bags and presses made for the purpose. The slops may be made useful for the feed of cattle.

The liquid drawn out as above described will be cleansed or defecated by a sufficient quantity of lime-water, which will be poured together with it into another wooden tub, at the bottom of which is a worm for dry steam, by means of which the liquid will be reduced to a density of 6° or 7° of the saccharometer. This liquid, having been allowed to settle during three or four hours, will be decanted into a third tub, also provided with a worm for dry steam, and in which it will be finally boiled down to a density of 40° or 41° of saccharometer. The process is then ended, and the product thus obtained is poured into coolers made for the purpose.

Saccharine matter for the production of sugar or sirup might also be extracted from the fecula of sweet potatoes by means of either sulphuric or hydrochloric acid diluted with water and boiled for eight or nine hours. But the great advantage of my process is that it produces an article of a quality superior, and at a cost less, than by any other process, and that the residue will be useful for the feed of cattle, which would not be the case in a process with the above-named acids, on account of the sulphate of lime produced by the chalk used to saturate the acids.

I claim as my own invention, and desire to secure by Letters Patent, the following:

1. Sweet potatoes for the making therefrom of sugar or sirup, by means of malted barley, as described and specified.

2. The process by which saccharine is extracted from sweet potatoes and converted into sugar or sirup, as described and specified, or any other process substantially the same.

CS. DELAMARRE.

Witnesses:
JNO. M. GIBSON,
L. G. LERANGER.